United States Patent

[11] 3,614,122

[72] Inventor Donald Gene Herren
 Box 85, Pawhuska, Okla. 74056
[21] Appl. No. 853,284
[22] Filed Aug. 27, 1969
[45] Patented Oct. 19, 1971

[54] LOW TIRE PRESSURE WARNING SYSTEM FOR TANDEM AXLE ASSEMBLIES
5 Claims, 5 Drawing Figs.

[52] U.S. Cl. ..................................................... 280/104.5, 340/58, 200/61.22
[51] Int. Cl. ...................................................... B60g 19/02
[50] Field of Search........................................... 280/104.5; 340/58; 200/61.22

[56] References Cited
UNITED STATES PATENTS
2,499,669 3/1950 Murat............................ 340/58 X
2,957,058 10/1960 Trott............................. 340/58 X FOREIGN PATENTS
1,243,760 9/1960 France ......................... 340/58
935,648 11/1955 Germany....................... 340/58
372,496 3/1923 Germany....................... 340/58

*Primary Examiner*—Philip Goodman
*Attorneys*—Clarance A. O'Brien and Harvey B. Jacobson ABSTRACT: A pair of movement-sensing signal-actuating mechanism for a tandem axle assembly of the type including a walking beam supporting adjacent ends of a pair of corresponding leaf springs of the axle assembly. The mechanisms are stationarily mounted relative to the frame of the associated vehicle and include movement-sensing portions operative to sense excess tilting of the walking beam such as occurs when the wheels on one end of one of the axles of the axle assembly are overloaded in proportion to the air pressure within he tire portions of the wheels. Further, the mechanisms also includes structure operative to actuate signals in response to their sensing such excess tilting of the associated walking beam in either direction.

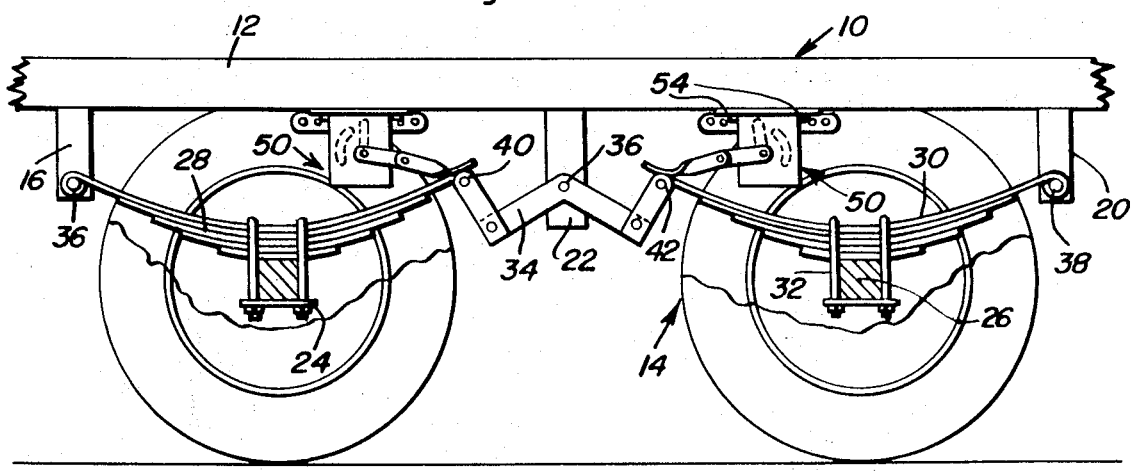
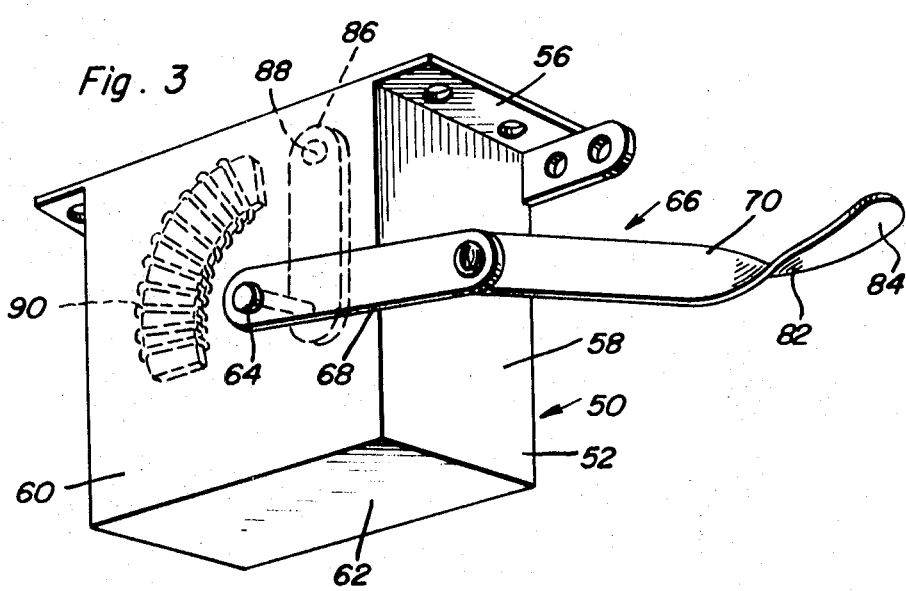
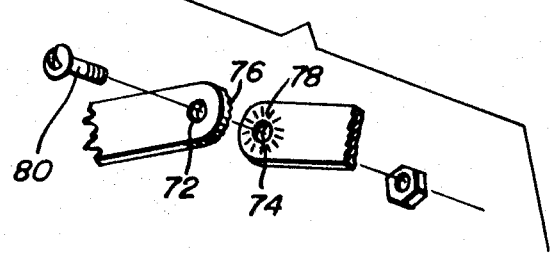
Donald Gene Herren
INVENTOR.

Donald Gene Herren
INVENTOR.

BY Clarence A. O'Brien
and Harvey B. Jacobson
Attorneys

3,614,122

LOW TIRE PRESSURE WARNING SYSTEM FOR TANDEM AXLE ASSEMBLIES

The low tire pressure warning system of the instant invention has been designed primarily for the purpose of warning the driver of a tandem axle vehicle when the wheels on one end of one of the axles are overloaded in proportion to the air pressure within the tire portions of those wheels.

Tandem axle vehicles are usually provided with dual wheels and it is possible for such a vehicle to be heavily laden with one of the wheels on one of the dual-wheel assemblies thereof deflated to the extent that the other dual wheel, in carrying more than its portion of the load, is at least partially flattened. Of course, continued movement of a tandem axle vehicle over the road at high speeds when one of the wheels thereof has excessively reduced air pressure therein and the corresponding dual wheel has been partially flattened due to its carrying more than its share of the load can result in the tire casings of both of the wheels being excessively damaged due to excessive flexing of the sidewalls thereof. In addition, if such a tire condition exists for an extended period during operation of the associated vehicle, a blowout of the flattened tire casing carrying more than its share of the load can occur resulting in a potential accident condition.

While it is possible, in some instances, for the drivers of tandem axle vehicles to become aware of low tire pressures soon after they occur, it is also possible, especially if the low tire pressure occurs at the rear end of a semitrailer, for a low tire pressure condition to go unnoticed by the driver of the vehicle for a considerable period of time.

Accordingly, it is the main object of this invention to provide an efficient signal means by which low tire pressures on tandem axle vehicles may be signalled to the driver of the vehicle as soon as the low tire condition occurs.

Another object of this invention, in accordance with the immediately preceding object, is to provide a low tire pressure warning system constructed in a manner whereby it may be utilized on substantially all tandem axle vehicles.

Another important object of this invention is to provide a warning system including an adjustment feature thereof enabling the warning system to be readily adapted for use on different types of tandem axle assemblies.

A further object of this invention is to provide a low tire pressure warning system in accordance with the preceding objects and constructed in a manner whereby some indication of the severity of the existent low tire pressure condition may be given.

A final object of this invention to be specifically enumerated herein is to provide a vehicle low tire pressure warning system in accordance with the preceding objects which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to the like parts throughout, and in which:

FIG. 1 is a fragmentary side elevational schematic view illustrating a conventional form of tandem axle assembly with which the warning system of the instant invention is operatively associated;

FIG. 3 is a perspective view of one of the movement-sensing mechanisms of the warning system;

FIG. 4 is a fragmentary exploded perspective view of the adjustable components of one of the movement-sensing mechanisms.

Figure 2:
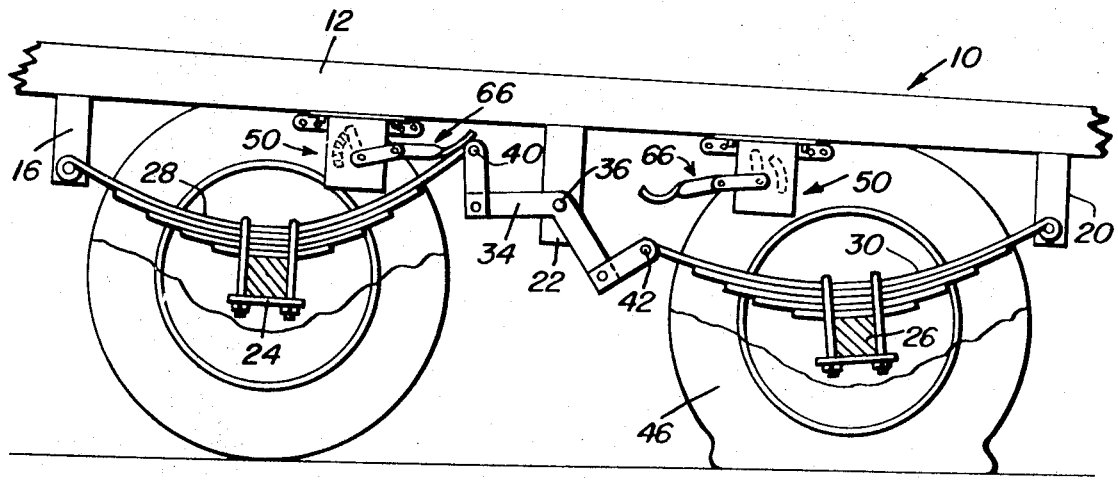
FIG. 2 is a fragmentary view similar to FIG. 1 and illustrating the manner in which the warning system or assembly is activated upon a low tire pressure condition occurring.
Figure 5:
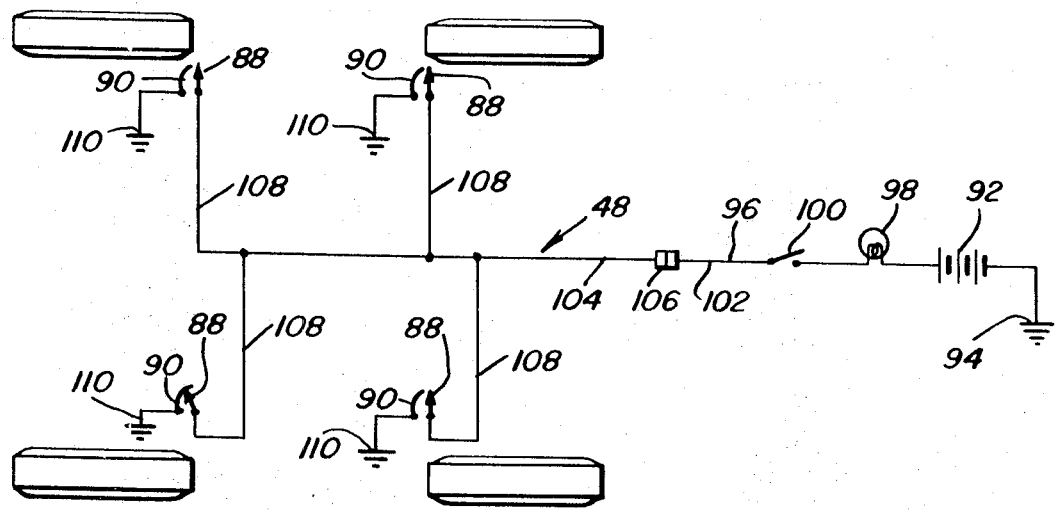
FIG. 5 is a diagrammatical view illustrating the manner in which the movement-sensing mechanisms may be utilized to actuate electrical signal means to be noted by the driver of the associated vehicle.

Referring now more specifically to the drawings, the numeral 10 generally designates a conventional form of vehicle including a frame 12 from which a tandem axle assembly referred to in general by the reference numeral 14 is supported.

The frame 12 includes a pair of depending front and rear hanger brackets 16 and 20 and a center support bracket 22. The tandem axle assembly 14 includes a pair of axles 24 and 26 and a pair of leaf springs 28 and 30 whose midportions are secured to the axles 24 and 26 by means of U-bolts 32. The assembly 14 further includes a walking beam 34 whose midportion is oscillatably supported from the mounting bracket 22 by means of a pivot pin 36. The remote ends of the springs 28 and 30 are supported from the hanger brackets 16 and 20 as at 36 and 38 and the adjacent ends of the leaf springs 30 are anchored to the opposite ends of the walking beam 34 as at 40 and 42.

It may be appreciated that the preceding description of the vehicle 10 comprises conventional structure and it may be seen from FIG. 2 of the drawings that when the axle 26 is lowered relative to the axle 24 due to one of the tires 46 mounted on the axle 26 being flat, the end of the leaf spring 30 remote from the hanger bracket 20 is lowered thereby resulting in the walking beam 34 being inclined in the manner illustrated in FIG. 2 of the drawings. The low tire pressure warning system of the instant invention is referred to in general by the reference numeral 48 and includes a pair of movement sensing mechanisms referred to in general by the reference numerals 50 for each side of the tandem axle assembly 14.

Each movement sensing mechanism 50 includes a base or housing 52 which is secured to the undersurface of the frame 12 by means of suitable fasteners 54 secured through apertured mounting flanges 56 projecting outwardly of the opposite end walls 58 of each housing 52. The housings 52 each also includes opposite sidewalls 60 and a bottom wall 62 interconnecting the corresponding end and sidewalls 58 and 60.

A pivot shaft 64 is journaled through each outer sidewall 60 and has one end of an elongated crank arm generally referred to by the reference numeral 66 secured on its outer end outwardly of the corresponding outer sidewall 60 for oscillation with the pivot shaft 64. Each crank arm 66 includes first and second sections 68 and 70 and adjacent ends of each pair of sections 68 and 70 are apertured as at 72 and 74 and disposed in end overlapped relation. The confronting surfaces of the sections 68 and 70 are serrated as at 76 and 78 and a fastener 80 is secured through each corresponding pair of apertures 72 and 74 and tightened so as to maintain the corresponding sections 68 and 70 in adjusted angular positions. The ends of the sections 70 remote from the sections 68 are twisted as at 82 and define abutment surfaces 84 for engagement with one of the adjacent ends of the springs 28 and 30.

The inner ends of the pivot shafts 64 have lever arms 86 mounted thereon for rotation therewith disposed inwardly of the corresponding sidewalls 60 and any suitable means may be provided within the housings 52 for limiting pivotal movement of the pivot shafts 64 in one direction in which the abutment surfaces 84 are lowered.

The free ends of the lever arms 86 are provided with insulated contacts 88 and each of the housings 50 has an arcuate resistance element 90 disposed therein and insulated therefrom along with the corresponding contact 88 is moved in electrical contact therewith upon movement of the corresponding pivot shaft 64 from the aforementioned limit position of rotation.

The vehicle 10 includes a suitable source 92 of electrical potential which is grounded as at 94 and a conductor 96 is electrically connected to the source 92 and has a signal lamp 98, and a control switch 100 serially connected therein. The conductor 96 comprises first and second sections 102 and 104 thereof which are electrically connected by means of a releasable connecting plug assembly 106 and four branch conductors 108 are electrically connected with the section 104 of the conductor 96 and are electrically connected to the contacts 88.

The arcuate resistance contacts 90 are grounded as at 110 and the contacts 88 are engageable with the ends of the arcuate resistance contacts 90 remote from the ground 110 upon movement of the pivot shafts 64 from their limit positions.

The abutment surfaces 84 of the crank arms 66 are disposed for engagement by the adjacent ends of the corresponding leaf springs 28 and as soon as one of the leaf spring ends 88 is sufficiently elevated relative to the frame 12 such as when the corresponding end of the associated walking beam 34 is inclined upwardly, the corresponding contact 88 engages the adjacent arcuate resistance contact 90 whereupon the lamp 98 is electrically actuated. Initial contact of one of the contacts 80 with the corresponding contact 90 results in the lamp 98 being only dimly lighted. However, as the corresponding crank arm 66 moves further from its limit position, less of the length of the arcuate resistance contact 90 is serially disposed in the circuit in which the lamp 98 is connected and thus the lamp 98 is actuated to higher brilliance.

It may therefore be seen that a slight loss of air pressure within one of the tires 46 may be sufficient to dimly light the lamp 98 and that the lamp 98 will be more brightly lighted as further air is lost from one of the tires 46.

It will of course be noted that each pair of contacts 88 and 90 could be disposed in its own circuit provided with a corresponding signal lamp. In this manner, the driver of the vehicle 10 would, by determining which lamp is lighted, be able to readily ascertain which tire 46 is deflated. In addition, while the warning system 48 as disclosed may also be utilized to some degree in indicating overloading of the vehicle 10 or uneven loading of the vehicle 10, a more precise determination of overloading and uneven loading would be afforded by a system including four different sections each with a signal lamp for the corresponding pair of contacts 88 and 90.

In operation, the right-hand tire 46 in the foreground of Figure 2 of the drawings has become deflated and the adjacent side of the axle 26 has been lowered relative to the frame 12. This of course causes the corresponding end of the walking beam 34 to be lowered and the remote end of the walking beam 34 to be elevated so as to engage the abutment surface 84 of the left-hand crank arm 66 whereupon the contact 88 of the left-hand movement-sensing mechanism will engage the corresponding contact 90 and cause the signal lamp 98 to be electrically actuated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a vehicle running gear assembly, a vehicle frame assembly supported from said running gear assembly, a pair of tandem axles having corresponding ends spring supported from said running gear assembly for up and down movement relative thereto, said assembly including a pair of movement-sensing mechanisms operatively associated with said ends for rendering a signal in response to one end being elevated appreciably above the other end, said movement-sensing mechanisms including base portions stationarily supported from said frame and contact members shiftably supported from said base portions for movement toward and away from limit positions, means yieldingly urging said contact members toward said limit positions, said contact members including portions operatively associated with said corresponding ends for shifting each contact member away from its limit position upon the corresponding end being elevated appreciably above the other end, said contact members including crank arm portions oscillatably supported at corresponding ends from said base portions, said crank arm portions including inner base end sections and outer free end sections, the adjacent ends of corresponding base and free end sections being secured together for relative angular positioning of said free ends about axes generally paralleling the axes of oscillation of said crank arm portions, the inner base end sections of said crank arm portion having contact arms mounted thereon including insulated electrical terminals on their free ends, said base portions including insulatively supported arcuate resistance contacts along which said terminals are swept during oscillation of said crank arms, said contacts and terminals being adapted to be serially electrically connected in an electrical circuit.

2. The combination of claim 1 wherein said outer free end sections are disposed for indirect engagement by the axle ends through the supporting springs.

3. In combination, a vehicle frame from which a tandem axle mounting assembly is supported, said assembly including front and rear hanger brackets and a center support bracket, a walking beam supported from said bracket for oscillation about a horizontal transverse axis disposed generally centrally intermediate the opposite ends of said walking beam, a pair of front and rear leaf springs having their remote ends supported from said hanger brackets and their adjacent ends supported from the front and rear ends of said walking beam, and a pair of movement-sensing mechanisms operatively associated with said adjacent ends of said springs and said front and rear ends of said walking beam for rendering a signal in response to excessive tilting of said beam in either direction about said axis from a generally horizontally disposed position, said movement-sensing mechanisms including base portions stationarily supported from said frame and contact member shiftably supported from said base portions for movement toward and away from limit positions, said contact members including portions operatively associated with said beam ends for shifting said contact members away from said limit positions as said beam ends are elevated above predetermined positions, said contact members including additional portions incorporating insulated electrical terminals thereon, said base portions including insulatively supported arcuate resistance contacts along which said terminals are swept during shifting movement of said contact members to produce a variable signal, said contacts and terminals being adapted to be serially electrically connected in an electrical circuit.

4. The combination of claim 3 wherein the portions of each contact member define a crank arm and have adjacent ends secured together for relative angular positioning.

5. In combination, a vehicle running gear assembly, a vehicle frame assembly supported from said running gear assembly, a pair of tandem axles having corresponding ends spring supported from said running gear assembly for up and down movement relative thereto, said assembly including a pair of movement-sensing mechanisms operatively associated with said ends for rendering a signal in response to one end being elevated appreciably above the other end, said movement-sensing mechanisms including base portions stationarily supported from said frame and contact members shiftably supported from said base portions for movement toward and away from limit positions, said contact members including portions operatively associated with said corresponding ends for shifting each contact member away from its limit position upon the corresponding end being elevated appreciably above the other end, said contact members including crank arm portions oscillatably supported at corresponding ends from said base portions, said crank arm portions including inner base end sections and outer free end sections, the inner base end sections of said crank arm portions having contact arms mounted thereon including insulated electrical terminals on their free ends, said base portions including insulatively supported arcuate resistance contacts along which said terminals are swept during oscillation of said crank arms, said contacts and terminals being adapted to be serially electrically connected in an electrical circuit.